G. R. MOORE.
WATER-CLOSET VALVE.
No. 175,728. Patented April 4, 1876.
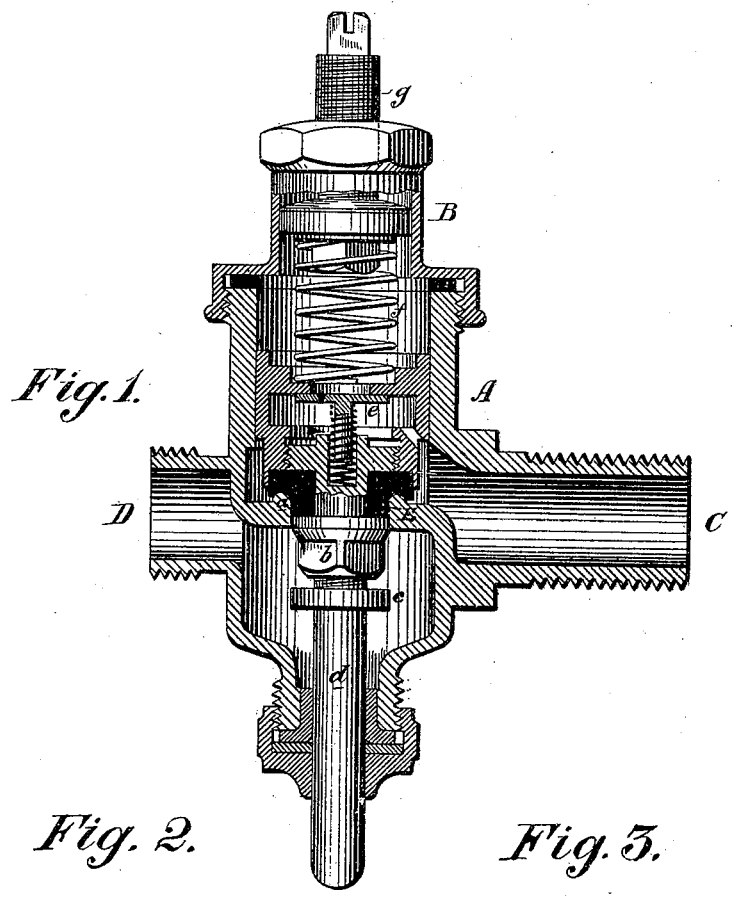
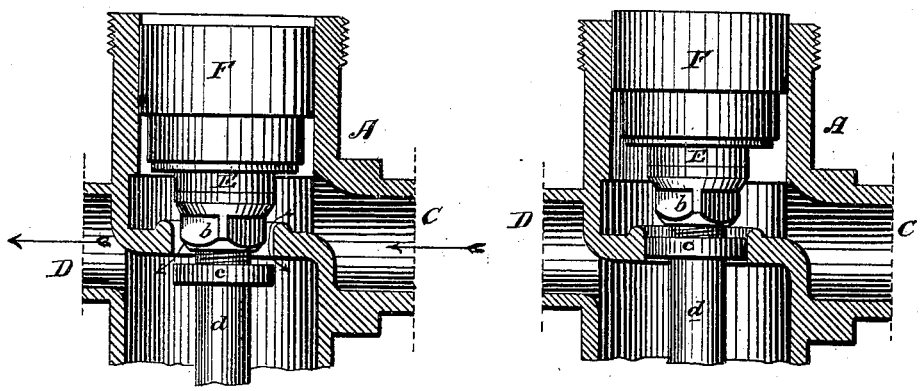
Witnesses:
Inventor
Geo. R. Moore

UNITED STATES PATENT OFFICE.

GEORGE R. MOORE, OF PHILADELPHIA, PENNSYLVANIA, ASSIGNOR OF ONE-HALF HIS RIGHT TO RICHARD McCAMBRIDGE, OF SAME PLACE.

IMPROVEMENT IN WATER-CLOSET VALVES.

Specification forming part of Letters Patent No. 175,728, dated April 4, 1876; application filed February 1, 1876.

*To all whom it may concern:*

Be it known that I, GEO. R. MOORE, of the city and county of Philadelphia, in the State of Pennsylvania, have invented certain new and useful Improvements in Water-Closet Valves, which improvements are fully set forth in the following specification, reference being had to the accompanying drawings.

The object of my invention is to provide water-closet valves with a reliable means, convenient of application, for preventing the jarring of pipes by the momentum of water as the valve closes; also, to produce a cheaper and more easily applied device than is usual, for checking the flow of water during the use of the closet-seat—that is, when the real valve is opened to its full extent.

For this purpose, my device consists of a stopper upon the stem of the valve, to be carried into the water-way, so as nearly to stop the flow of water whenever the valve is opened to its full extent.

The situations in which this device is desirable are perfectly well understood by all persons skilled in the art of putting in water-closet valves.

Figure 1 is a vertical section, with parts finished in a perspective view, of a water-closet valve containing my improvement. In this view the valve is shown as closed normally by the spring. Fig. 2 is the same kind of a view of the portion presented as that given in Fig. 1, and shows the valve fully open to allow the water to pass freely, as indicated by the arrows. Fig. 3 differs from Fig. 2 only by showing the situation of the parts when the device for checking the flow of water is made operative by being pressed up into the water-way, so as to fill the space within the annular valve-seat.

A and B screwed together constitute the shell and frame-work in which the valve is made. C is the inlet; D, the outlet. E is a nipple-shaped or flanged rubber ring, the smaller part of which passes freely into the water-way, and its flanged portion constitutes a facing upon the valve proper. It is fastened upon the stem $d$ by the nut $b$, which has a flange of equal size of E at the point of junction of the two, by which the rubber nipple is protected.

The usual form of rubber facings used in this kind of valves is a simple ring without the nipple. I have found the nipple faced with metal, as just described, more reliable to prevent the jarring of pipes.

$a$ is the valve-seat. $c$ is a collar upon the valve-spindle $d$, of the size requisite to fill the water-way when pressed into it, though not so tight as to prevent its passing freely through it from either direction. Its use I have before stated. $e$ is a valve for emptying the retard-chamber; $f$, a spring; $g$, regulating-screw. F is the plunger.

I claim—

1. The nipple-shaped rubber or elastic valve-facing E, in combination with the flanged nut $b$, both operating so as to pass freely in and out of the water-way of the valve-seat $a$, substantially as and for the purpose herein set forth.

2. The elastic nipple-shaped valve-facing E, the flanged nut $b$, valve-seat $a$, spindle $d$, provided with collar or stopper $c$, all arranged and combined substantially as and for the purpose herein set forth.

GEO. R. MOORE.

Witnesses:
 J. PLANKINTON,
 WILLIAM SHANE.